United States Patent [19]

Franz

[11] 4,129,452
[45] Dec. 12, 1978

[54] STABILIZATION OF N,N'-[(THIOCARBONYL)THIO]DIMORPHOLINE

[75] Inventor: Curtis A. Franz, Piscataway, N.J.

[73] Assignee: American Cyanamid Company, Stamford, Conn.

[21] Appl. No.: 814,603

[22] Filed: Jul. 11, 1977

[51] Int. Cl.² ............................................. C08L 91/00
[52] U.S. Cl. ............................... 106/243; 260/18 EP; 260/23.7 M
[58] Field of Search ................... 106/245; 260/18 EP, 260/792, 23.7 M; 544/160

[56] References Cited

U.S. PATENT DOCUMENTS

| | | | |
|---|---|---|---|
| 2,556,145 | 5/1951 | Niederhauser | 260/23.7 H |
| 2,833,734 | 6/1958 | Morrissey | 260/23.7 H |
| 3,239,486 | 8/1966 | Willis | 260/18 EP |
| 3,329,645 | 4/1967 | Childers | 260/45.95 R |
| 3,637,555 | 1/1972 | Marinacci | 260/23.7 M |

OTHER PUBLICATIONS

Chem Abst:72:22461q.

*Primary Examiner*—Theodore Morris
*Attorney, Agent, or Firm*—Frank M. Van Riet

[57] ABSTRACT

N,N'-[(thiocarbonyl)thio]dimorpholine is stabilized, as an accelerator for rubber, by incorporating therein an oxirane compound having a molecular weight of greater than 60.

10 Claims, No Drawings

STABILIZATION OF N,N'-[(THIOCARBONYL)THIO]DIMORPHOLINE

BACKGROUND OF THE INVENTION

N,N'-[(thiocarbonyl)thio]dimorpholine is a rubber accelerator which has good scorch protection and provides a fast rate of cure. Unfortunately, the compound is not stable on storage alone at ambient temperatures, as evidenced by its loss of accelerator activity with time. In fact, at temperatures of 110°–115° F., commonly encountered in warehouses during the warm months, the compound suffers considerable loss of activity in a relatively short time. If a means for stabilizing this accelerator could be found, a long-felt need would therefore be satisfied.

SUMMARY

I have now found that N,N'-[(thiocarbonyl)thio]-dimorpholine (I)

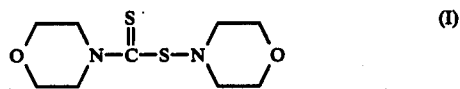

can be stabilized against deterioration by the incorporation therein of an oxirane compound having a molecular weight greater than 60.

DESCRIPTION OF THE INVENTION INCLUDING PREFERRED EMBODIMENTS

N,N'-[(thiocarbonyl)thio]dimorpholine is an old compound. It can be readily made by reacting sodium 4-morpholinocarbodithioate (II) with N-chloromorpholine (III):

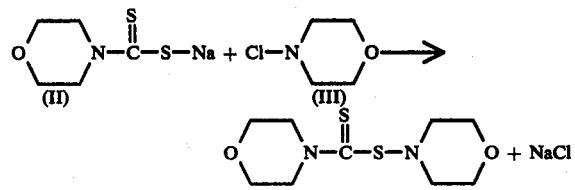

Another method is described by Smith et al., U.S. Pat. No. 3,417,086 whereby (II) is reacted with morpholine and an oxidizing agent such as an aqueous solution of iodine and potassium iodide or sodium hypochlorite or other oxidizing agent known in the art for the preparation of thiocarbonylsulfides.

Use of the compound as an accelerator is described by Taylor, Rubber Chem. & Tech. 47 (No. 4), 906–910 (1974).

The oxirane compounds which are useful herein are those organic oxirane compounds having a molecular weight of greater than about 60 and have no functional groups reactive with the dimorpholine other than the oxirane ring. These compounds include, but are not limited to, alkyl, cycloalkyl and aryl glycidyl ethers; mono- and diepoxidized alkenes and dienes, including epoxidized diene polymers, such as, for example, 1,2- and 2,3-epoxybutane and epoxidized polybutadiene; cycloalkylene oxides such as cyclohexene oxide, vinyl cyclohexene diepoxide etc.; diglycidyl ethers of aliphatic diols such as the diglycidyl ether of 1,4-butanediol; diglycidyl ethers of bisphenols such as the diglycidyl ether of isopropylidene bisphenol (Bisphenol A) or diglycidyl ethers of methylene bisphenol and oligomers thereof; epoxidized oils such as epoxidized linseed oil etc.; epoxidized unsaturated diglycidyl ethers of polymeric diols and polyglycidyl ethers of polyols and the like.

In practicing the invention, N,N-[(thiocarbonyl) thio]dimorpholine is blended in any convenient manner consistent with the invention with the oxirane compound. Since N,N-[(thiocarbonyl)thio]dimorpholine is not very stable, the procedure used to blend it with the oxirane should avoid exposure to elevated temperatures for too long a period of time. Nevertheless, one method of producing the blend is to melt the N,N-[(thiocarbonyl)thio]dimorpholine, blend in the appropriate oxirane compound, allow the molten blend to cool and either flake or grind the resultant solid for use. Alternatively, the two compounds may be dry blended. The blending method is not critical to the invention; however, it will be understood that not all stabilizer compounds will melt or dissolve into the molten accelerator and dispersions may sometimes result, and that, in some instances, it may be better to dry blend and vice versa.

The blends may be prepared in any weight ratio without incident, but the oxirane concentration should range from about 0.1 percent, by weight, to about 5.0 percent, by weight, depending on the particular stabilizer, it being realized that the stabilizers may vary in their effectiveness in stabilizing the accelerator compound. Preferably, the dimorpholine may be effectively stabilized against deterioration on aging using about 1 to 3 percent, by weight, of the oxirane compound, based on the weight of the dimorpholine.

Stabilization, as defined for the purposes of this invention, means any significant improvement in the stability of the N,N'[(thiocarbonyl)thio]dimorpholine after storing for a period of time at normal room temperatures or at an elevated temperature. An accelerated aging test which exemplifies the stabilization is defined hereinbelow. Improvement in stability means any significant reduction of the loss of cure rate experienced by use of the unstabilized compound during a similar period of storage under the same conditions, and/or any significant decrease in the loss of scorch protection (scorch time) relative to the unstabilized compound. The unstabilized compound ordinarily suffers degradation on storage over a period of time such that its use in a vulcanization results in a slower rate of cure and oftentimes a reduction in scorch time. This is often manifested in the vulcanized rubber product by slower development of optimum modulus properties and in many cases the extent of the full cure may be affected, i.e., the optimum properties may not be attained.

Cure rate is determined by use of a Monsanto Oscillating Disc Rheometer and is reported as the maximum slope of the cure curve in inch-pounds per 0.5 minute operating against an oscillating disc embedded in the rubber stock undergoing vulcanization.

Mooney Scorch Time is the elapsed time from the onset of the heating cycle to the start of vulcanization (induction period). With reference to the cure curve traced by the Mooney Viscometer, scorch is reported as $t_5$, which is the time, in minutes, from one minute after the start of heating, for a five point rise in the cure curve above the minimum in the curve, at the temperature of the test, which is usually chosen to represent maximum processing temperature of the unvulcanized rubber composition.

The stabilized N,N-[(thiocarbonyl)thio]dimorpholine is evaluated, as discussed above, in terms of the improvement over an unstabilized sample thereof after a period of aging. It is difficult to determine what constitutes normal storage conditions, in terms of the physical form of storage (drums, fiber packs, paper bags, etc.), the length of storage in days, weeks or months, or the temperature of storage (air-conditioned warehouses or exposure to ambient temperature in the warmer climates). In order to evaluate the effectiveness of the stabilizers by a reasonable set of conditions, unless otherwise stated, the stabilized and unstabilized compounds were stored in closed containers for (a) two weeks at normal room temperature (25°-30° C.), (b) for one month at 45° C., and (c) 2 months at 45° C. The compounds were then evaluated in a standard rubber formulation as described in the following illustrative examples.

In the examples which follow, the compounds were evaluated for effectiveness of the stabilizer using the rubber masterbatch shown below (which contains 100 parts by weight of rubber stock):

| Masterbatch | |
|---|---|
| Styrene-butadiene rubber (oil-extended) | 89.5 |
| Cis- 4 Polybutadiene | 35.0 |
| Philbrick #5 aromatic oil | 25.5 |
| Carbon black | 75.0 |
| Zinc oxide | 5.0 |
| Stearic acid | 1.5 |
| N-Phenyl-N'-(1,3-dimethylbutyl)-p-phenylenediamine | 1.0 |
| Sulfur | 1.8 |

EXAMPLE 1

To a sample, comprising 100 parts of N,N-[(thiocarbonyl)thio]dimorpholine, are added 4.0 parts of 3,4-epoxycylcohexylmethyl-3,4-epoxycyclohexane carboxylate.

The stabilized sample is then added to the above masterbatch after storage for 6 weeks at 25% RH and 45° C., at a concentration of 0.9 part of stabilized sample to 100 parts of masterbatch, as described above, with compounding.

The sample is then subjected to testing in order to ascertain the accelerator activity in promoting the vulcanization reaction as measured by the cure rate and identified as Composition A. A sample containing no stabilizer is set forth for comparative purposes, in Table I, below.

TABLE I

| Maximum Cure Rate | None | A |
|---|---|---|
| (in.-lbs./0.5 min.) | Oscillating Disc Rheometer at 316° F | |
| 6 Weeks | 3.4 | 3.8 |
| Maximum Torque (inch - pounds) | | |
| 6 Weeks | 44.5 | 49.5 |
| Scorch Time (t₅) (minutes) | Mooney Viscometer at 270° F | |

TABLE I-continued

| 6 Weeks | 12.8 | 24.0 |
|---|---|---|

The data show that N,N'-[(thiocarbonyl)thio]dimorpholine is improved (stabilized aganist degradation) by the incorporation therein of 4.0 percent, by weight, of the epoxy compound, as shown by the retention of cure rate after storage for 6 weeks at 45° C. and 25% RH and by the stability of the Mooney Scorch.

EXAMPLES 2-5

The procedure of Example 1 is again followed except that the oxiranes are (B) 2.0% of epoxidized soybean oil, (C) 1.0% of vinyl cyclohexene diepoxide (D) 5.0% of the diglycidyl ether of 1,4-butanediol and (E) 0.75% of the diglycidyl ether of 4,4'-isopropylidenebisphenol. In each instance, effective stabilization of the N,N-[(thiocarbonyl)thio]dimorpholine is accomplished.

EXAMPLE 6

Again, following the procedure of Example 1, except that the oxirane comprises 2.5% of the diglycidyl ether of phenol-formaldehyde condensate, satisfactory stabilization is achieved.

EXAMPLES 7-10

When the stabilizer of Example 1 is replaced by (F) 0.5% of 2,3-epoxypropyl-n-hexylether, (G) 1.0% of epoxidized butyl linseed oil (H) 3.5% of epoxidized linseed oil and (I) 4.0% of 2,2-bis[4-(2,3-epoxypropoxy)-phenyl] propane; effective stabilization of the accelerator is achieved.

I claim:

1. A stabilized accelerator composition for rubber comprising N,N'-[(thiocarbonyl)thio]dimorpholine and an effective stabilizing amount of an oxirane compound having a molecular weight greater than about 60.

2. The composition of claim 1 wherein the oxirane compound is 3,4-epoxycyclohexylmethyl-3,4-epoxycyclohexane carboxylate.

3. The composition of claim 1 wherein the oxirane compound is epoxidized linseed oil.

4. The composition of claim 1 wherein the oxirane compound is 2,2-bis[4-(2,3-epoxypropoxy)phenyl]propane.

5. The composition of claim 1 wherein the oxirane compound is epoxidized soya bean oil.

6. A method for the stabilization of N,N'-[(thiocarbonyl)thio]dimorpholine against storage degradation which comprises adding thereto an effective stabilizing amount of an oxirane compound having a molecular weight greater than about 60.

7. A method according to claim 6 wherein the oxirane compound is 3,4-epoxycyclohexylmethyl-3,4-epoxycyclohexane carboxylate.

8. A method according to claim 6 wherein the oxirane compound is epoxidized linseed oil.

9. A method according to claim 6 wherein the oxirane compound is 2,2-bis[4-(2,3-epoxypropoxy)phenyl]-propane.

10. A method according to claim 6 wherein the oxirane compound is epoxidized soya bean oil.

* * * * *